Figure 1:
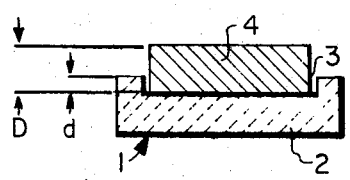

United States Patent

[11] 3,581,039

[72] Inventors Fumiaki Kanzaki;
Yoshio Kozakura; Kozo Akahide, Chiba-shi; Tamotu Suzuki, Shimizu-shi, Japan
[21] Appl. No. 767,962
[22] Filed Oct. 16, 1968
[45] Patented May 25, 1971
[73] Assignees Kawasaki Steel Corporation
Kobe-shi, Japan;
Nippon Kokan Kabushikikaisha
Tokyo, Japan
[32] Priority Oct. 16, 1967, Dec. 13, 1967
[33] Japan
[31] 42/66,420 and 42/79,480

[54] METHOD OF ONE-SIDE ARC WELDING AND BACKING MATERIAL THEREFOR
17 Claims, 10 Drawing Figs.
[52] U.S. Cl. .................................................. 219/73
[51] Int. Cl. ................................................ B23k 9/18
[50] Field of Search .................................. 219/160, 73, 137

[56] References Cited
UNITED STATES PATENTS
3,192,357  6/1965  Duffey ........................ 219/73
3,197,604  7/1965  Turbyville .................... 219/160
3,351,734  11/1967 Arikawa ...................... 219/160
3,365,566  1/1968  Kuder ......................... 219/160
3,432,915  3/1969  Doyle ......................... 219/160
3,461,264  8/1969  Nelson ........................ 219/160

Primary Examiner—Milton O. Hirshfield
Assistant Examiner—R. Skudy
Attorney—Fidelman, Wolffe & Leitner ABSTRACT: A method for welding steel plates and the like from one side, and a backing material therefor are provided which yields welds of exceptional quality, uniformity, and control. The weld backing material comprises a rigid channeled portion, containing an elastic mineral fiber composite in the channel, where the depth of the channel and the thickness of the fiber composite are determined by the following formula:

$$D = \frac{\rho c \text{ min.}}{\rho i}(d+m)$$

where $D$ is the thickness of the composite, $d$ is the depth of the channel, $\rho c$ min. is the minimum compressed volumetric specific gravity of the composite, $\rho i$ is the initial volumetric specific gravity of the composite, and $m$ is the maximum misalignment of the plates to be welded. Welding is accomplished by compressing the backing material along the back of the joint to be welded and welding from the opposed side.

PATENTED MAY 25 1971

3,581,039

SHEET 1 OF 2

METHOD OF ONE-SIDE ARC WELDING AND BACKING MATERIAL THEREFOR

The present invention relates to an improvement in one-side welding of steel plates by using backing materials made of fiber composite and rigid channel shape members, which provides the excellent penetration beads, easy operation, and low crack sensitivity.

Recently, the method of the one-side welding carried out only from one side of the plate has been attracted the attention as one of the new technique in butt welding of steel plates. Some of many advantages in this method are: compared with the conventional both-side welding, the weldments need not be turned over, so that the total time required is extremely reduced, the operation in the factory of lower roof is feasible, and conveyor system can be applied in the places such as assembly stage of shipbuilding, etc.

As a whole, one-side welding may roughly be divided into the two categories, i.e. copper plate backing method and flux backing method, either of which has not been satisfactory. Namely, although excellent penetration bead appearance can be obtained by the copper backing method owing to the channel portion on the backing plate, in case there are any misjudgment or distortion in the base metal, since the backing plate itself is a rigid material, it causes a gap between the base metal and the backing plate and from this part the molten metal flows out and brings about fin, and further the molten metal is liable to precede in the channel of the backing plate over the position of molten bath which causes defects such as incomplete penetration, overlap and undercut, etc. On the other hand, flux backing method may use more simple equipments and such defects are hardly brought about in the penetration bead, but the height and width of penetration bead can not afford to be regulated due to the powdery flux used as backing. In any case, large heat input, this method becomes impossible because of increasing such irregularity. Further, an essential problem in the one-side welding, especially, flux backing method, is that the hot crack sensitivity is higher as compared with the both-side welding method.

When the rigid backing plate is used together with powdery flux, good penetration bead can be obtained, but in this case powdered or grained flux is must be spread evenly on the surface of the backing plate and be kept in such condition, so it takes much difficulty in operation, when used for the field welding or the vertical welding.

Further, it has been proposed that the tape is used as a backing material which is manufactured from the glass fiber. In the case the tape is pasted on the base metals by binder, it keeps close adhesion to the base metals at misjudgment, however, it can only be applied to the very small ranges of heat input because there is the danger of "burnthrough" of the molten metal. When the tape is held up with the rigid member, fins will occur due to the lack of close adherence at the position of misjudgment or distortion of the base metals.

The object of the present invention is to resolve the disadvantages as mentioned above and to provide a fairly sound penetration bead, an excellent appearance of bead and a low hot crack sensitivity of weld metal.

One of the essentials of the present invention is the combination of steps of fabricating backing materials by putting on elastic mineral fiber composite in a channel of rigid member, holding up said backing materials to the reverse surfaces of base metals at the root of groove, compressing said mineral fiber sufficiently, and applying arc welding from one side.

The other is to provide a suitable backing material comprising a rigid member having a channel portion, and an elastic mineral fiber composite put in the channel.

According to the present invention, the height of the penetration bead is precisely regulated by the rigid channel shape member, and at the same time the fin or the flowout of molten metal does not occur due to filling the gap at the misjudgment or distortion of the base metals by the elastic mineral fiber composite in shape of felt or rope.

The description of the drawings in case of the felt shape composite is as follows:

In FIG. 1, numeral 1 shows backing material used for the present invention which consists of rigid member 2 having the channel 3 made of metal or of refractory and mineral fiber felt 4 put in the channel 3. The depth $d$(mm.) of the channel 3 needs about 1 mm. larger than the height of penetration bead (usually 1—3 mm.). The thickness $D$(mm.) of the felt 4 needs to satisfy the conditions mentioned afterwards and this should at least be larger than "$d$" which forms the projection out of the edge of the channel.

Figure 2:
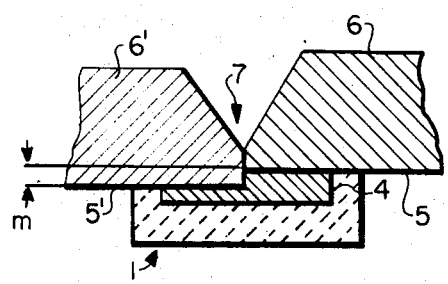
Figure 3:
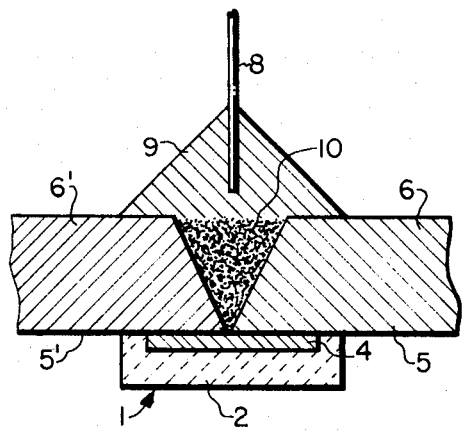

FIG. 2 and FIG. 3 show the state of thus fabricated backing material 1 held up to the reverse surfaces 5 and 5' of the base metals 6 and 6'. In FIG. 2, the misadjustment is appeared as "$m$" and the base metal 6 is separated from the rigid member 2, however, the felt 4, owing to its elasticity, is closely attached to the base metals 6 and 6' preventing perfectly the formation of fins.

FIG. 3 shows the state of the backing free from misjudgment, and shows the state of submerged arc welding using iron powder, in which 8 represents electrodes, 9 flux, and 10 iron powder filled in the groove 7, respectively.

Figure 4:
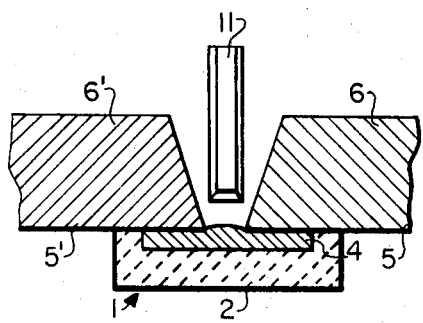

FIG. 4 shows the case of applying the backing material of the present invention to the manual welding with the coated electrode 11.

In the present invention, the felt or rope of mineral fiber composite should be deformed or compressed and should be closely attached to the reverse surfaces of the base metals with complete elasticity.

For this purpose, the volumetric specific gravity of the composite before they are compressed between the base metals and the rigid member must be an appropriate value. According to the experiments, it has turned out that such specific gravity (hereinafter referred to as $\rho i$, i.e. initial volumetric specific gravity) should be below 0.3 g./cm.$^3$ in case of felt and below 0.5 g./cm.$^3$ in case of rope.

Figure 5:
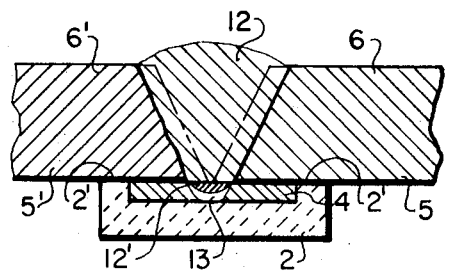

According to the present invention, a part of the composite just below the root melts and thereby the penetration bead 12' of weld metal 12 can be formed as shown in FIG. 5, wherein the felt is used as composite. The melted mineral fiber then forms a slag layer 13 of 1—2 mm. in thickness and covers the surface of the penetration bead 12' and the remaining felt or rope prevents the flowout of the molten metal and regulates the shape of the penetration bead 12'.

Figure 6:
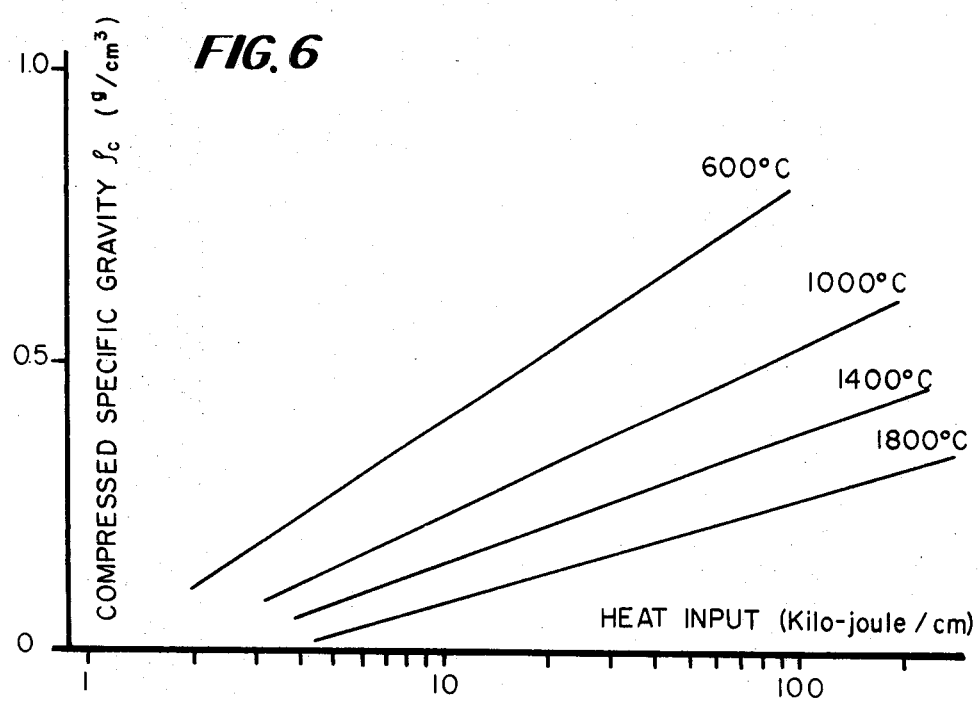

In order that the above-mentioned function is satisfied, it is essential that both the melting point and the volumetric specific gravity after compressed (hereinafter referred to as $\rho c$, i.e. compressed volumetric specific gravity) of the mineral fiber, should be kept within a reasonable range. The mineral fiber, of which melting point is between 600—1,800°C., can be used by selecting the compressed specific gravity according to the welding conditions. In case the heat input is large, it is necessary to keep the melting point high enough and the compressed specific gravity large enough to prevent the overmelting of the mineral fiber. With the occurrence of the overmelting, some defect takes place in the flowout of molten metal, fin, overlap and irregular height of penetration bead. According to the experiment, as shown in FIG. 6, it has become evident that there is a relation among the heat input H (kilojoule/cm.), the melting point of the mineral fiber T (° C.) and compressed volumetric specific gravity of the mineral fiber $\rho c$ (g./cm.$^3$). In the graph of FIG. 6, each of the straight line shows the lower limit of the melting point at which the flowout of the molten metal is prevented and the well-conditioned penetration bead is formed, and accordingly the upper left part of this line shows the range of condition in which the welding in this invention can be performed.

Generally speaking the amounts of the distortion and misjudgment at the butt welding of steel plate can roughly be estimated from the dimension and shape of the base metals. The minimum value of $D$(mm.), thickness of the mineral fiber composite before compression is obtained by the following formula, supposing its upper limit of said amounts of the distortion and misjudgment is $m$(mm.):

$$D_{\min.} = \frac{\rho c_{\min.}}{\rho i}(d+m) \quad (1)$$

where $\rho c$ min. is the minimum value of the compressed volumetric specific gravity $\rho c$ obtained from the graph in FIG. 6, and can also be obtained from the following formula:

$$\rho c \text{ min.} = \left(\frac{430}{T+415} - 0.02\right) \log_{10} H - 8.3 T \times 10^{-5} + 0.03 \quad (2)$$

Generally, in the one-side welding of this kind, the flowout of molten metal is apt to occur at the upper layer of backing material while not at the lower layer since the thick slag layer is formed at the lower portion. It is not always necessary, therefore, that the whole part of mineral fiber composite meets the mutual relation of the compressed volumetric specific gravity, the melting point and the heat input as given in FIG. 6, but only the upper layer of the composite in contact with the base metals is enough to meet the above relation.

Various experiments show that in order to prevent the formation of flowout at the upper layer, the minimum thickness of the upper layer which meets the above-mentioned relation requires 0.2 mm. after compression.

In the present invention, the form of mineral fiber composite can be not only single and homogeneous, but also double or multiplex. The mineral fibers with different composition or figures may be set up to the multilayer composite with conditions of having necessary elasticity as a whole and satisfying the above-mentioned relation in FIG. 6 in the upper layer at least.

Figure 7:
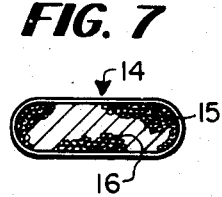

The multilayer composite can variously be applied in this method and some examples are shown as follows:

FIG. 7 shows a continuously rope-shaped material 14 which consists of outer tubular layer 15, made of woven glass fiber cloth and fillings 16, for example, cottonlike mineral fiber. This material is suitable for the field welding because its handling is easy.

Figure 8:
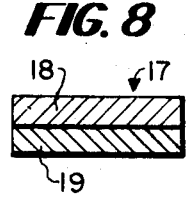

FIG. 8 shows the double layer felt 17, the upper layer 18 of which consists of the felt of high melting point and the lower layer 19 consists of the felt of low melting point. This is suitable for such cases as the holding-up and compression of the backing material is light or heat input is large.

Figure 9:
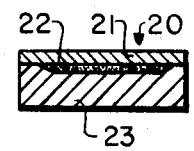

FIG. 9 shows the three layer composite 20, the upper layer 21 of which is a woven glass fiber, the intermediate layer 22 of which consists of spread powder such as deoxidizer, Fe–Mn, Fe–Si etc. and/or slag former, MgO, TiO$_2$, CaF$_2$, etc., and the lower layer 23 of which is the felt-shaped mineral fiber. This material is suitable for the welding of rusty steel plates or for high-speed welding.

The powder mentioned above can be used not only in the three layer composite, but also in other composite having a shape such as rope, provided that the quantity of such powder to be applied is so far as the elasticity of the composite is suitable on the whole.

The shape and appearance of the penetration bead depend upon the property of formed slags. In general, the slag forming material of the low melting point is good for a uniform and faultless penetration bead. However, in case such as submerged arc welding etc. which require a large heat input, extremely high compressed volumetric specific gravity is required so that it can meet the conditions described in FIG. 6. Consequently, the multilayer composite, i.e. the combination of the the mineral fiber with high melting point preventing efficiently the flowout and other mineral fiber with low melting point forming a good penetration bead in appearance, is especially effective in welding with a large heat input.

The mineral fiber is composed of SiO$_2$ as the principal ingredient and Al$_2$O$_3$, MgO, CaO, Na$_2$O, etc. selectively, and it is melt to form a slag for the penetration bead. The organic ingredient may be used below 8 percent, if necessary, but in case of more than 8 percent it causes defect such as blowhole and so on. The powder of slag former added to the composite cooperates to the mineral fiber at the slag formation; that is MgO, TiO$_2$, CaO, Al$_2$O$_3$, etc. The powder of deoxidizer such as metallic Mn, Fe–Si, Fe–Mn, etc. can be used. Also, these powdery ingredients may be added to the rope-shaped and multilayer-typed composite, as they are. Further, they may also be baked on the surface of felt with suitable binder to make very thin layer.

Further, the present invention is more effectively carried out by filling the groove with low carbon iron powder. The presence of iron powder prevents the arc from reaching to the root of groove and overheating the mineral fiber and so uniform slag is formed.

The following are the description on the effect of rigid member on the hot crack sensitivity: Generally speaking, the one-side welding has a higher hot crack sensitivity, compared with the both-side welding. In the flux backing, this tendency is remarkably high and so the welding condition of this method is defined in the range of very low heat input.

The hot crack sensitivity can be improved in the present invention as follows:

Described below are about the backing materials for the one-side welding, in which the mineral fiber composite is used.

It is found that the shape, dimension, and thermal property of the rigid member have close relation with the hot crack sensitivity. It is desirable that the channel width of rigid member is kept below 20 mm. and the material thereof is the metal like copper having a high thermal conductivity.

Figure 10:
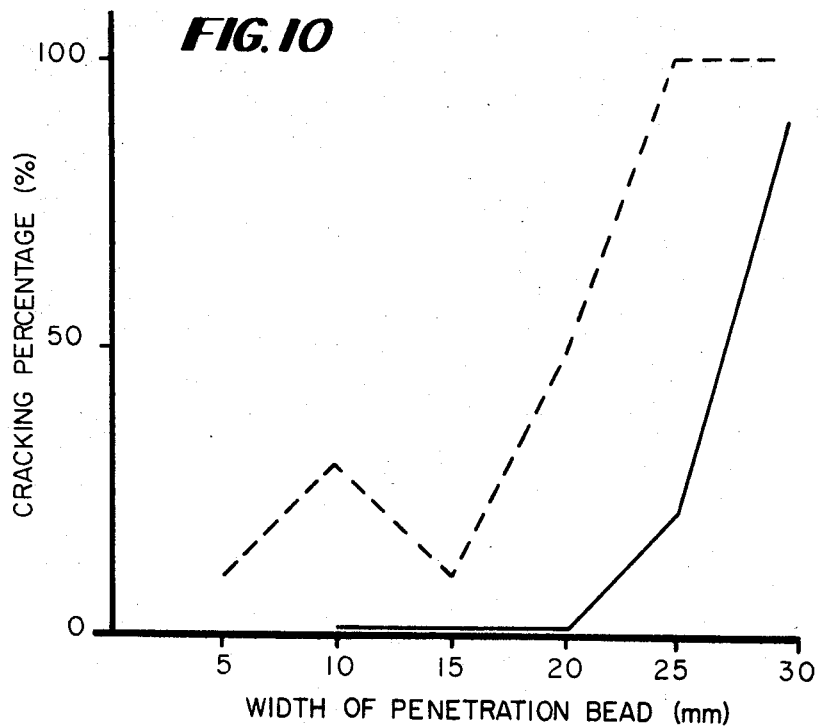

FIG. 10 shows the relation between the cracking percentages and the width of penetration bead. The solid line shows the relation used narrow channel rigid members, the width of which is slightly wider than that of the penetration bead, and the dotted line shows the relation used the channel member of 50 mm. width. This is a result of the cracking test using a test piece of mild steel (SM–41) dimensioned 1,000 mm. length, 500 mm. width and 25 mm. thickness, under condition of highly restraining with 150 mm. pitch, seven points. The welding was made for only one run (1300 a., 33 v., 28 cm. min.) with a single-Vee groove of 50°, filling the groove with the iron powder. The cracking percentages are indicated the ratio of number of cracked sections per examined sections along the weld line of 1,000 mm. in 90 mm. pitch. In order to change the width of penetration bead, the volume of the filling iron powder has been varied. The evident difference in hot crack sensitivity between two lines in FIG. 10 can easily be recognized.

Reasons of the above-mentioned fact may be supposedly itemized:

For the first, as shown in FIg. 5 the shoulders 2' of the rigid member 2 get contact with the base metals 6 and 6' at the neighborhood of the root of groove 7, so that suitable cooling rate and desirable direction of dendrite are obtained.

The second, as the mineral fiber composite have the small volumetric specific gravity the slag layer is formed preferably.

The third, the sectional figure of the weld metal 12 is in good shape with wide surface and narrow bottom.

According to the relation shown in FIG. 10, the smaller the width of penetration bead is, the less the danger of cracking is. In case of the high restraint, the sound weld metal is obtained using the mineral fiber and the copper backing plate having the channel of below 20 mm. width.

In the present invention, even if the base metals have the misjudgment or distortion, the fin of penetration bead or the flowout of the molten metal would not occur.

Furthermore, since the preformed backing composite in shape of felt or rope is used, the charging into the rigid member is carried out very easy.

By making the channel width of the rigid material below 20 mm. and also using the material of a good thermal conductivity such as copper, a sound weld metal can be obtained without any danger of cracking, even in such cases as the field welding under high restrained condition. The present invention can be applied to the various kinds of arc welding such as the submerged arc welding, the CO$_2$ arc welding, the open arc welding, and the coated electrode manual arc welding, etc. Further, as far as the welding position, it is applicable to flat, vertical, horizontal, or overhead welding.

Next, examples of the present invention will now be described.

EXAMPLE 1

The submerged arc welding was carried out on steel plates (SM-41, 32 mm. thick) in such manner as shown in FIG. 3.

Rigid member of copper with the channel of 3 mm. in depth and 18 mm. in width, and each of shoulder portions, 5 mm. was used. Mineral fiber composite was composed of $Al_2O_3$-56 percent, $SiO_2$-45 percent, and $Na_2O$-1 percent with the melting point of 1,700° C. The initial volumetric specific gravity was 0.12 g./cm.$^3$, the thickness was 12 mm. The single pass welding was performed under condition of 1,500 a., 42 v., 20 cm./min. (the heat input, 190 kilojoule/cm.).

The penetration bead was 1.7—2.2 mm. in thickness and 14—15 mm. in width. The appearance thereof was extremely beautiful and completely free from the occurrence of defect such as fin, overlap, undercut, etc.

The X-ray test and the side bending test proved no internal defect such as crack, blowhole, slag inclusion, etc.

EXAMPLE 2

The vertical-up welding was carried out on steel plates (SM-50; 12 mm. thick) by the manual arc welding using the low hydrogen coated electrode.

Rigid member of steel with the channel of 50 mm. width and 3 mm. depth was used. Mineral fiber composite was double layer and its upper layer was composed of $SiO_2$—33 percent, $Al_2O_3$-15 percent, CaO-41 percent, MgO-4 percent, $TiO_2$-3 percent, $CaF_2$ percent and $Na_2O$-2 percent with the melting point of 1,200° C., and the lower layer of which was composed of $SiO_2$-55 percent, $Al_2O_3$-15 percent, CaO-16 percent, $B_2O_3$-10 percent and other-4 percent with the melting point of 900° C. The initial volumetric specific gravity of the both was 0.10 g./cm.$^3$, each thickness was 10 mm., totaling 200 mm. The welding conditions for the first layer was 140 a., 26 v., 13 cm./min. (the heat input, 17 kilojule/cm.) and then three layers followed to the first layer.

As a result, both the X-ray test and bending test proved no defect, and the penetration bead ranged between 2.0—2.3 mm. in thickness and 8—10 mm. in width, the appearance thereof was extremely beautiful. This welding was carried out by a half-a-year experienced worker without special skill.

We claim:

1. In the method of welding steel plates from one side comprising butting said plates, applying a backing to one side of the joint thus formed, and welding said joint from the side opposed to said backing, the improvement comprising utilizing as said backing a material comprising a rigid channeled member and an elastic mineral fiber composite disposed within the channeled portion of said member, where the thickness of said composite exceeds the depth of the channel by at least an amount defined by $$D = \frac{\rho c \text{ min.}}{\rho i}(d+m)$$

where $D$ is the thickness of said composite, $d$ is the depth of said channel, $\rho c$ min. is the minimum compressed volumetric specific gravity of the composite, $\rho i$ is the initial volumetric specific gravity of the composite, and $m$ is the maximum misalignment of said joint.

2. A backing material comprising a rigid channeled member and an elastic mineral fiber composite disposed within the channeled portion of said member, where the thickness of said composite exceeds the depth of the channel by at least an amount defined by $$D = \frac{\rho c \text{ min.}}{\rho i}(d+m)$$

where $D$ is the thickness of said composite, $d$ is the depth of said channel, $\rho c$. min. is the minimum compressed volumetric specific gravity of the composite $\rho i$ is the initial volumetric specific gravity of the composite, and $m$ is a constant defined by the maximum misalignment of a welded joint to be formed using said backing material.

3. Method according to claim 1, wherein said arc welding is submerged arc welding.

4. Method according to claim 3, advance of welding from the one-side, further step of filling the groove with iron powder is added.

5. Method according to claim 1, wherein said arc welding is $CO_2$ arc welding.

6. Method according to claim 1, wherein said arc welding is open arc welding.

7. Method according to claim 1, wherein said arc welding is coated electrode manual arc welding.

8. Method according to claim 1, wherein said mineral fiber composite is compressed against said joint from an initial volumetric specific gravity $\rho i$ of below 0.5 g./cm.$^3$ to a compressed volumetric specific gravity $\rho c$ obtained by the following formula:

$$c = \left(\frac{430}{T+415} - 0.02\right)\log_{10}H - 8.3T \times 10^{-5} + 0.03$$

and said arc welding is carried on with a heat input of below H kilojoule/cm., where H is given in said formula.

9. Backing material according to claim 2, wherein the melting point of said mineral fiber composite is between 600 and 1,800° C.

10. Backing material according to claim 2, wherein said mineral fiber composite contains $SiO_2$ as principle ingredient, and organic ingredients of below 8 percent.

11. Backing material according to claim 2, wherein said mineral fiber composite is a felt-shaped mineral fiber having an initial volumetric specific gravity of below 0.3 g./cm.$^3$.

12. Backing material according to claim 2, wherein said mineral fiber composite is of at least two layers.

13. Backing material according to claim 12, wherein said mineral fiber composite has layers containing powder of deoxidizer and/or slag former.

14. Backing material according to claim 2, wherein said mineral fiber composite is a rope-shaped material consisting of outer tubular layer and fillings of mineral fiber, and having an initial volumetric specific gravity of below 0.5 g./cm.$^3$ on the whole.

15. Backing material according to claim 14, wherein said fillings contains powder of deoxidizer and/or slag former.

16. Backing material according to claim 2, wherein said rigid member is made of metal and has a width of channel of below 20 mm.

17. Backing material according to claim 16, wherein said rigid member has shoulder portions of more than 3 mm., respectively, in both sides of said channel.